UNITED STATES PATENT OFFICE.

HERMANN SCHULZE-BERGE, OF PITTSBURG, PENNSYLVANIA, ASSIGNOR TO HIMSELF AND JESSE H. LIPPINCOTT, OF SAME PLACE.

CRAYON FOR ETCHING GLASSWARE.

SPECIFICATION forming part of Letters Patent No. 283,424, dated August 21, 1883.

Application filed April 19, 1883. (No specimens.)

*To all whom it may concern:*

Be it known that I, HERMANN SCHULZE-BERGE, of Pittsburg, in the county of Allegheny and State of Pennsylvania, have invented a new and useful Improvement in Crayons for Etching Glassware; and I do hereby declare the following to be a full, clear, and exact description thereof.

The etching of glassware, as practiced prior to my invention, has been effected chiefly by two methods, one by the use of liquid hydrofluoric acid, and the other by means of what is known as the "sand-blast."

I have recently made application for Letters Patent for certain processes invented by me of etching glassware by means of salts of fluorine—such as the fluorides of sodium and of potassium—then dispensing with the use of hydrofluoric acid in a liquid form, and also by the use of the fixed alkalies, or those of their salts which lose their acid constituent in the presence of silica—such as the carbonates of soda and of potash.

My present invention has relation to a means (not referred to in the said application) for applying such substance to the surface of glassware preparatory to subjecting them in a suitable furnace to the degree of heat required for producing the chemical reaction between the fluorine in the one case, and the alkali in the other, and the silica of the glass.

Glass being a silicate of potash or of soda, with the addition of other ingredients, fuses at a temperature depending on the proportion of alkali which it contains, the fusing-point being lowered by an increase of the alkaline ingredient. Hence the addition of alkali on any part of the surface of the glass will, by the application of a degree of heat below that at which the glass would otherwise melt, cause the alkali to unite with the glass at that point, the effect of which is to destroy the smooth glassy surface and produce a marked degree of opacity, akin to the effect produced by hydrofluoric acid in etching. Again, if a compound of fluorine and alkali be applied to the surface of the glass or any part of it and a suitable degree of heat be applied, (which will be below the melting-point of the glass,) a chemical reaction takes place between the silica of the glass and the fluorine of the alkaline fluoride, causing a still more decided effect than that produced by the fixed alkalies alone. It is necessary, however, to the utilization of the process that the alkali, or fluoride of alkali, as the case may be, should be deposited on the surface of the glass in lines having definite outline, and which will preserve their integrity without running together when the glass is subjected to the necessary firing process. Among other methods which I have devised for that purpose is the use of crayons containing the alkalies or alkaline fluorides in such a manner that they will be deposited on the surface of the glass by writing or sketching thereon with such crayons.

It is the manufacture and composition of crayons suitable for the purposes above stated which forms the subject of the present invention.

The ingredients of which my crayons are composed consist of the alkaline substance by which the etching effect is produced and a suitable fusible or soluble vehicle, with which such etching substances are compounded into a mass of sufficient solidity to answer the purpose of pencils or crayons, with which sharply-defined lines may be drawn. The etching ingredients are, in the first place, the fluorides of the fixed alkalies—as fluoride of sodium and fluoride of potassium. These substances are solid bodies, and should be finely pulverized, so as to enter into intimate mixture with the vehicle by which they are formed into crayons.

The fluoride of sodium may be used in the natural form of cryolite, which is a double fluoride of aluminium and sodium, containing only thirteen per cent. of aluminium; but in this case the opacity produced on the glass is not so decided as if the aluminium were absent.

If the alkalies are to be used without fluorine, I employ the fixed alkalies or their salts, more especially the carbonates. Some of the salts of the alkalies are inapplicable—as the tartrates, for example—on account of their property of swelling when undergoing decomposition. These are in like manner thoroughly pulverized before being mixed with their vehicle.

The vehicle which I employ for forming the pulverized ingredients into a plastic mass may be paraffine-wax, with a sufficient amount of tallow or other fat to make a mass of the required melting-point. This may be varied, so as to make harder or softer crayons, as may be desired. A little oleine may also be added to reduce the melting-point. Solid resinous substances are also suitable for this purpose, in which case the desired melting-point may be attained by the addition of wax or tallow, and a small quantity of ethereal or fatty oils.

If preferred, the solid resinous substance may be first dissolved in benzine, or a mixture of benzine and turpentine, and the pulverized alkali, or alkaline fluoride mixed with it in that condition, after which the volatile solvent may be evaporated by means of a water bath until the mass is sufficiently stiff, but yet plastic enough to shape into crayons. Gelatine may also be used as a vehicle, the gelatine being dissolved in water, and then after mixing the pulverized ingredient the water may be evaporated until the right degree of plasticity is given to the mass. The pasty mass thus formed is then formed into pencils or crayons by rolling or by pressure in a mold, or by forcing the pasty mass through closed dies having a cavity of the required shape.

In making such crayons advantage may be taken of the plastic nature of the compound to shape the crayons by means of dies to any desired fanciful conformation in cross-section—such as stars, crescents, rings, &c.—so that by touching the glass with them those shapes may be printed on the surface of the glass. In like manner letters may be formed, like type, out of the crayon material, by which printing may be done on a glass surface by applying the end of the crayon to the glass in a position at right angles thereto.

The proportions of the etching ingredients to the base or vehicle will depend upon the capacity of the vehicle to hold the pulverized material and yet retain its firmness and solidity when mixed and dried. The largest quantity of pulverized fluoride or alkali that can be mixed with the base, so as to form a plastic mass capable of adhering together so as to be used as a crayon, should be employed. When thus formed into the desired shape, the crayons are covered with some material—such as varnish, collodion, starch, tin-foil, or paper. This will protect them from injury and from liability to fracture readily, and will, especially if the vehicle is of a fatty or sticky nature, enable them to be used without soiling the fingers.

The method of using these crayons in decorating glassware is to heat the glass, or that part of it which is to be sketched or written upon with the crayon, sufficiently to soften the vehicle which forms the base of the crayon, whether of a fatty, resinous, or gelatinous nature. This heating of the glass may be effected in any convenient way by placing the glass, if flat, over a sand bath, or over a vessel, or on a table, to which heated air is supplied by means of a pipe or otherwise. If the article be hollow—as a vase, for example—a pipe may be introduced into it through a stopper inserted into the mouth of the vessel, which will prevent the escape of the hot air and obviate any unpleasant effect to the workmen; or the drawing or writing may be made on the glassware while yet hot after it is molded, pressed, or blown, in which case no special heating is necessary.

Another method of using these crayons is to use a solvent for the base of which they are composed. If the base be gelatine, water may be used; if resin, benzine will answer the purpose. Such solvent may be contained in a crayon-holder made to contain a sufficient quantity and supply it to the point of the crayon when in use. Such crayons being sectile and fusible, may be sharpened with a knife, or by drawing them in an inclined position over any heated surface.

After the desired drawing, writing, or printing has been made on the surface of the glass with a crayon, the glass article is placed in a furnace at a low temperature. The heat is then gradually raised until the fatty, resinous, or gelatinous base of the crayon material is evaporated or charred, leaving a deposit of fluoride or of alkali, as the case may be, on the surface of the glass. The heat is then still further raised up to about 750° Fahrenheit, in case the fluoride crayon has been employed, or to about 800° Fahrenheit, if the alkaline crayon has been used, and then to a still higher degree of heat, depending on the character of the glass and the effect desired to be produced thereon. The heat having produced the desired reaction, the article of glass is then slowly cooled and the process is complete, excepting that in case of etching with the alkaline crayons the glass should be thoroughly washed when cool enough, so as to remove any trace of alkali from the surface of the glass. After the preliminary heating a different effect may be produced by exposing the glass to heat sufficient to melt glass, but only long enough to soften the surface without changing the shape of the article. In this case the etched surface assumes a chalky, white appearance, the etching being much more marked than in the instance first named. If the heat be raised only to that which would soften the surface, the etching effect would be similar to that produced by hydrofluoric acid.

Having thus described my improvement, what I claim as my invention, and desire to secure by Letters Patent, is—

1. As a new article of manufacture, crayons composed of fluoride of sodium, or fluoride of potassium, or equivalent fluoride, mixed with a vehicle or base of resinous, fatty, or gelatinous substance, substantially as described, and for the purpose set forth.

2. As a new article of manufacture, crayons composed of an alkaline salt or salts mixed with a vehicle or base of resinous, fatty, or gelatinous substance, substantially as and for the purpose described.

3. In the process of manufacturing crayons of plastic, soluble, or fusible material, forcing the plastic mass through a die or dies having a cavity of the shape in cross-section which it is desired to give to the finished crayon.

4. As an improvement in crayons made of fusible or sticky material, coating the same with starch, collodion, varnish, or equivalent substance, so as to enable them to be used without soiling the fingers.

In testimony whereof I have hereunto set my hand this 13th day of April, A. D. 1883.

HERMANN SCHULZE-BERGE.

Witnesses:
W. B. CORWIN,
JAMES V. BAKEWELL.